Figure 1:
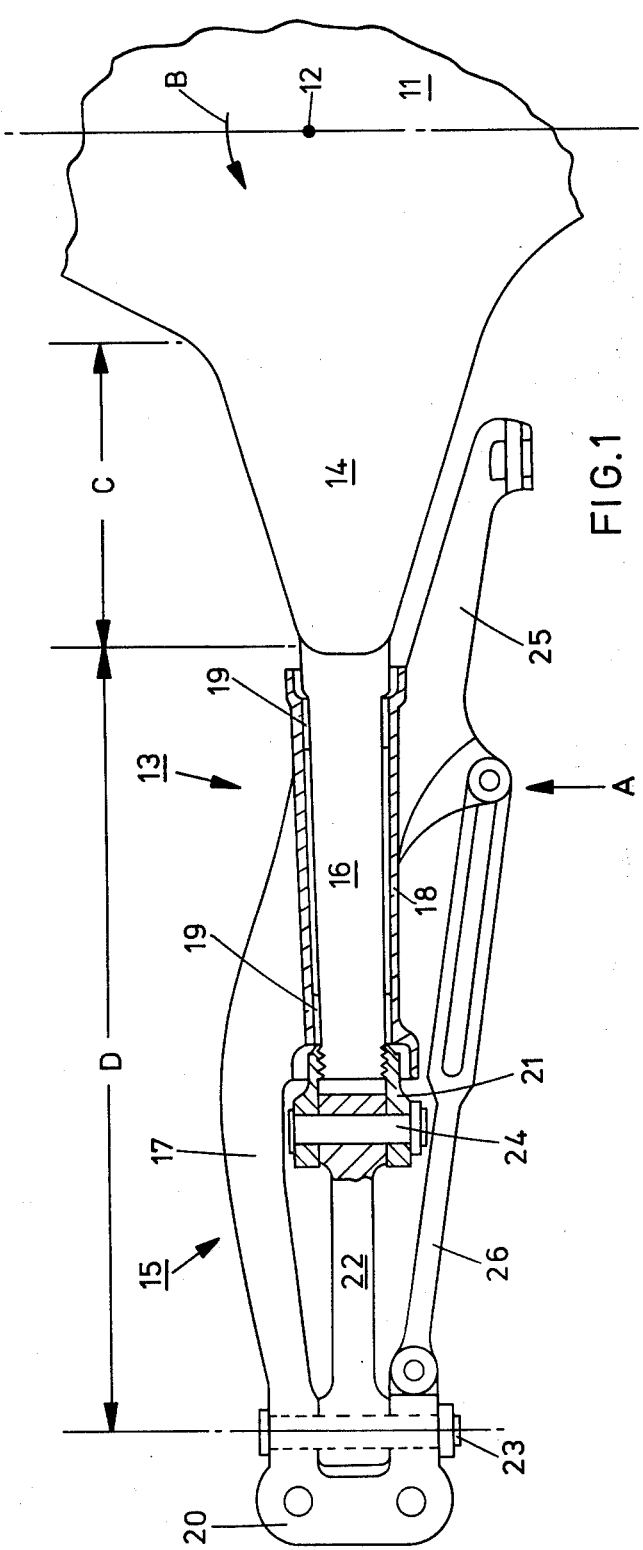

United States Patent
Watson

[11] 4,021,141
[45] May 3, 1977

[54] SEMI-RIGID ROTORS FOR ROTARY WING AIRCRAFT

[75] Inventor: Kenneth Watson, Yeovil, England

[73] Assignee: Westland Aircraft Limited, Yeovil, England

[22] Filed: Aug. 25, 1975

[21] Appl. No.: 607,591

[30] Foreign Application Priority Data
Sept. 6, 1974 United Kingdom ............ 39109/74

[52] U.S. Cl. .............................. 416/141; 416/138
[51] Int. Cl.² ........................................ B64C 27/38
[58] Field of Search .......... 416/141, 138, 135, 140, 416/134

[56] References Cited
UNITED STATES PATENTS

| | | | |
|---|---|---|---|
| 2,121,345 | 6/1938 | Hafner | 416/135 X |
| 3,026,942 | 3/1962 | Cresap | 416/135 X |
| 3,280,918 | 10/1966 | Drees et al. | 416/135 X |
| 3,501,250 | 3/1970 | Mosinskis | 416/141 X |
| 3,762,834 | 10/1973 | Bourquardez et al. | 416/141 |
| 3,885,887 | 5/1975 | Desjardins | 416/135 |
| 3,926,536 | 12/1975 | Ciastula et al. | 416/135 |
| 3,941,503 | 3/1976 | Bruel | 416/141 |

FOREIGN PATENTS OR APPLICATIONS

| | | | |
|---|---|---|---|
| 935,352 | 6/1948 | France | 416/135 |
| 751,109 | 6/1956 | United Kingdom | 416/142 |

*Primary Examiner*—Everette A. Powell, Jr.
*Attorney, Agent, or Firm*—Larson, Taylor & Hinds

[57] ABSTRACT

This invention relates to a semi-rigid rotor of the type in which each rotor blade is attached to a hub through a flexure member comprising an inner part which accommodates flapping movements and an outer part which accommodates lead/lag movements. In the arrangement of the present invention the outer part of each flexure member comprises a spindle extending from the inner part and an arm extending from a housing rotationally mounted on the spindle, the arm extending outwardly to an outer end arranged for connection to a rotor blade and spaced-apart radially from an outer end of the spindle. A tie-bar interconnects the outer end of the arm and the spindle, and means are provided to rotate the housing to effect pitch changes of the rotor blade during operation.

10 Claims, 2 Drawing Figures

SEMI-RIGID ROTORS FOR ROTARY WING AIRCRAFT

This invention relates to semi-rigid rotors for rotary wing aircraft.

Semi-rigid rotors are characterized by the absence of hinges that articulate the rotor blades to the rotor hub for flapping and lead/lag movements, such movements being accommodated by flexure members, having appropriate elastic bending characteristics, connecting the blades to the hub. One such semi-rigid rotor construction is disclosed in U.S. Pat. No. 3,926,536 which issued on Dec. 16, 1975, from U.S. application Ser. No. 434,482 filed Jan. 18, 1974, which is a continuation of application Ser. No. 188,329 filed Oct. 12, 1971; in that construction, the rotor blades are connected to a rotor hub through flexure members extending radially outwardly therefrom, each flexure member comprising inner and outer parts connected through a feathering hinge. During operation, blade flap movements are permitted by resilient flexing of the inner parts and blade lead/lag movements are permitted by resilient flexing of the outer parts. Centrifugal loads are transmitted through tie-bars extending through the centres of the feathering hinges to join the inner and outer parts of the associated flexure members.

Because of the location of the tie-bar, the feathering hinge bearings have to be of relatively large diameter, requiring a large diameter feathering hinge housing which is aerodynamically unclean and can give rise to unacceptable drag loads tending to offset the otherwise beneficial characteristics of the semi-rigid rotor. Moreover, the necessary length of the outer part of the flexure member, located entirely outboard of the feathering hinge, results in a requirement for a long flexure member tending further to increase drag loads.

According to the invention I provide, for a rotary wing aircraft, a semi-rigid rotor including a rotor hub arranged for rotation about a generally vertical axis and a plurality of rotor blades, each rotor blade being attached to the hub through flexure members comprising an inner part extending from the hub and being resiliently flexible in a plane perpendicular to the plane of rotation to accommodate rotor blade flapping movements during operation, and an outer part extending from the inner part for attachment of the rotor blade and being resiliently flexible in a plane coincident with the plane of rotation to accommodate rotor blade lead/lag movements during operation, each outer part comprising a spindle extending from an outer end of the inner part, a housing rotationally mounted on the spindle, and an arm secured along an outer surface of the housing in the plane of rotation and extending outwardly to an outer end arranged for connection to the rotor blade and spaced apart radially from an outer end of the spindle, a tie-bar interconnecting the outer end of the arm and the end of the spindle, and means for rotating the housing to effect pitch change movements of the rotor blade.

The housing may be mounted on bearings located adjacent each end of the spindle, and the bearings may be either mechanical or elastomeric bearings.

The surface of the housing on which the arm is secured may be a trailing surface during rotation of the rotor.

The tie-bar may be secured between a fork end screwed onto the outer end of the spindle and inwardly facing jaws provided on the outer end of the arm. Each tie-bar may be secured by pins lying in the plane of rotation of the rotor.

A lead/lag damper may be connected between the outer end of the arm and the housing, and may be arranged to lie in the plane of rotation of the rotor and on the opposite side of the housing to the arm. The lead/lag damper may be an elastomeric damper.

Figure 2:
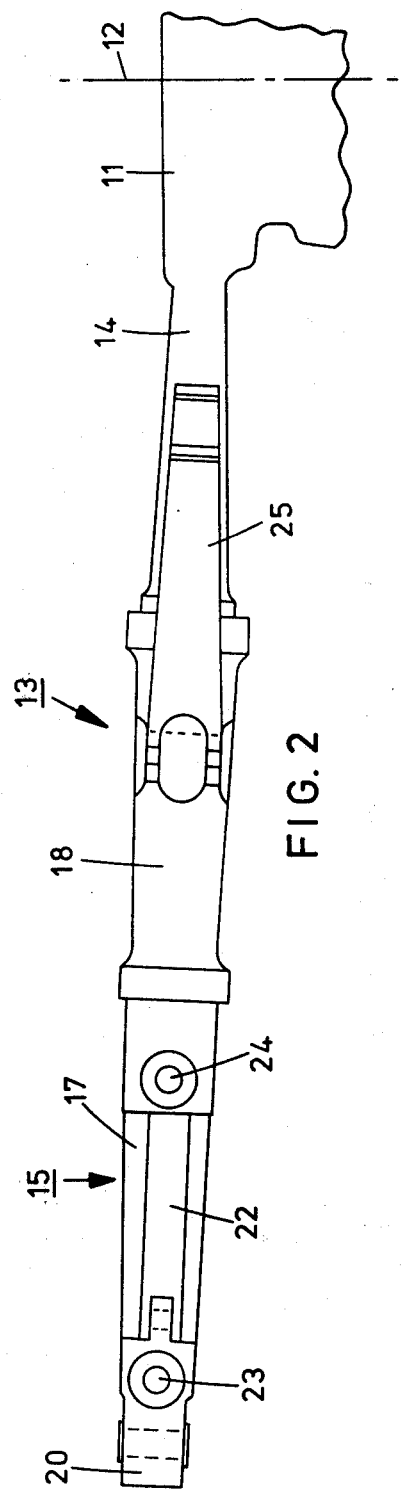

The invention will now be described by way of example only and with reference to the accompanying drawings, in which:

FIG. 1 is a fragmentary, part-sectional plan view of a semi-rigid rotor according to the invention; and FIG. 2 is a side view taken on arrow A of FIG. 1.

The illustrated semi-rigid rotor has a rotor hub 11 arranged for rotation in the direction of arrow B about a generally vertical axis 12. Each of a plurality of rotor blades (not shown) is connected to the hub 11 through flexure members generally indicated at 13 extending radially from the hub 11 and comprising an inner part 14 and an outer part 15.

The inner part 14, extending through distance C in FIG. 1, is formed integral with the hub 11 and tapers from a substantially parallel sided cross-section elongated in a horizontal plane at the hub 11 to a substantially circular cross-section at its outer end, and is resiliently flexible in a plane generally perpendicular to the plane of rotation (the flap plane).

The outer part 15, extending through distance D in FIG. 1, comprises a spindle 16 formed integral with an outer end of the inner part 14 to extend radially therefrom, and an arm 17 supported by a generally cylindrical housing 18 rotationally mounted on bearings 19 located adjacent to each end of the spindle 16. The arm 17 is formed integral with the housing 18, being joined to the latter along substantially the whole length of the housing 18 and, in the embodiment shown, is located in the plane of rotation and on the trailing side of the housing 18, as will be clear from reference to the direction of rotation indicated by the arrow B. The arm 17 extends outwardly in a loop and terminates in an outer end 20 arranged for attachment of a rotor blade (not shown), the outer end 20 being spaced-apart radially from the outer end of the spindle 16. The outer part 15 comprising the spindle 16 and the arm 17 is resiliently flexible in a plane generally coincident with the plane of rotation (lead/lag plane), and is of circular or other suitable cross-section to ensure that its stiffness in the flap plane equals its stiffness in the lead/lag plane.

A fork end 21 is screwed onto a threaded section at the outer end of the spindle 16, and the outer end 20 is provided with inwardly facing jaws. A tension-torsion tie-bar 22 is located between the jaws at the outer end 20 and the fork end 21 and is secured by pins 23 and 24 respectively lying in the plane of rotation so that the tie-bar 22 connects the outer end 20 of the arm 17 to the outer end of the spindle 16 to retain the arm 17 in operative position.

In the embodiment shown a lead/lag damper 26, preferably of the elastomeric type, is located in the plane of rotation and opposite the arm 17 between a boss on the outer end 20 and a boss formed on the housing 18, the boss on the housing 18 being extended inwardly to form an integral arm 25 arranged at its inner end for connection to flying controls (not shown). Movement of the arm 25 causes rotation of the housing 18 about the spindle 16, thereby constituting a feathering hinge to effect pitch changes of the blade (not shown) through the arm 17.

Location of the tie-bar 22 outboard of the feathering hinge enables the diameter of the spindle 16 to be determined with reference only to its required strength and stiffness, enabling it to have the minimum practicable area presented in the direction of rotation, as is evident from FIG. 2 in which the damper 26 is omitted. Furthermore, because part of the length of the arm 17 overlaps the length of the spindle 16, while the spindle 16 also functions as part of the outer part 15 for operational purposes, the overall length of the outer part 15, and therefore of the entire flexure member 13, is minimised.

The tie-bar 22 ensures that the outer part 15 is relieved of centrifugal loads during operation, which are transmitted through the tie-bar 22, the spindle 16, and the inner part 14 to the hub 11.

A suitable material for the inner and outer parts 14 and 15 of the flexure members 13 is titanium, the inner part 14 being forged integral with the hub 11. The bearings 19 may be either mechanical roller type bearings or elastomeric bearings, and, if elastomeric bearings are employed, they may be arranged to provide lead/lag damping so that a separate lead/lag damper such as the lead/lag damper 26 may not be required.

In the operation of such a semi-rigid rotor, resilient flexing of the inner parts 14 accommodates the majority of the blade flap movements of all the individual parts of the assembly within distance C of FIG. 1, while resilient flexing of the outer parts 15, comprising the arm 17 and the spindle 16, accommodates the majority of the blade lead/lag movements of all the individual parts of the assembly within distance D of FIG. 1. Blade pitch changes are accommodated through rotation of the feathering hinge by movement of the arm 25 causing rotation of the outer end 20 of the arm 17 to which the blade is attached.

Although the majority of lead/lag plane movements are accommodated by bending deflection outboard of the outer end of the inner parts 14 (FIG. 1), the equivalent stiffness of the outer parts 15 in the flap and lead/lag planes minimises an undesirable phenomenon known as bending/torsion coupling and thereby avoids adverse pitching moments and torsional deflections of the rotor blades being caused by blade flap and lead/lag movements. The disposition of the inner and outer parts 14 and 15 ensures that no torsional moments are taken onto the inner part 14 which may therefore be flexible in torsion, enabling a high fundamental torsional nature frequency of the blade to be achieved - a very desirable feature from an aeroelastic viewpoint. Flap and lead/lag fundamental frequencies are individually controlled by the inner and outer parts 14 and 15 respectively of the flexure members 13, so that the critical root end stressing of the rotor blades is largely divorced from the problems of obtaining the required fundamental flap and lead/lag frequencies. The rotor provides good handling and stability by giving good response to control inputs combined with high aerodynamic damping.

The desirable operational characteristics of the semi-rigid rotor construction of said patent, are enhanced in the construction of the present invention by minimising aerodynamic drag during operation, by reason of the very "low profile" and clean lines of the rotor in the plane of rotation achieved by separating the tie-bar 22 from the feathering hinge, and to the reduction in overall length achieved by the overlapping of the arm 17 with the spindle 16 and utilising the spindle 16 as part of the outer part 15 for operational purposes, as compared with the prior art arrangement discussed.

The semi-rigid rotor hereinbefore described is of what is known as the "sub-critical" type; that is, a rotor having a first lag mode frequency below the normal operating rotational frequency of the rotor.

Although one embodiment has been described and illustrated, it is to be understood that various modifications can be made without departing from the scope of the invention as defined in the appended claims. For instance, the inner parts 14 may be individually manufactured and may be secured to the hub 11 by bolting. Composite materials such as those incorporating glass or carbon fibres may be used for the manufacture of at least some of the parts. As noted, the bearings 19 may be of elastomer material so that the rotor is completely devoid of mechanical bearings or hinges, thereby improving the integrity of the rotor and further reducing the maintenance and servicing requirements of rotors of this type. In alternative embodiments, each outer part 15 may include a second arm 17 located in the plane of rotation on the opposite side of the housing 18 so as not to adversely affect the profile of the rotor in the plane of rotation.

I claim as my invention:

1. For a rotary wing aircraft, a semi-rigid rotor including a rotor hub arranged for rotation about a generally vertical axis and a plurality of rotor blades, each rotor blade being attached to the hub through flexure members comprising an inner part extending from the hub and being resiliently flexible in a plane perpendicular to the plane of rotation to accommodate rotor blade flapping movements during operation, and an outer part extending from the inner part for attachment of the rotor blade and being resiliently flexible in a plane coincident with the plane of rotation to accommodate rotor blade lead/lag movements during operation, each outer part comprising a spindle extending from an outer end of the inner part, a housing rotationally mounted on the spindle, and an arm secured along an outer surface of the housing in the plane of rotation and extending outwardly to an outer end arranged for connection to the rotor blade and spaced-apart radially from an outer end of the spindle, a tie-bar interconnecting the outer end of the arm and the end of the spindle, and means for rotating the housing to effect pitch change movements of the rotor blade.

2. A rotor as claimed in claim 1, wherein the housing is mounted on bearings located adjacent each end of the spindle.

3. A rotor as claimed in claim 2, wherein the bearings are elastomeric bearings.

4. A rotor as claimed in claim 1, wherein the surface of the housing to which the arm is secured is a trailing surface during rotation of the rotor.

5. A rotor as claimed in claim 1, wherein the tie-bar is secured between a fork end member screwed onto the outer end of the spindle and inwardly facing jaws provided on the outer end of the arm.

6. A rotor as claimed in claim 5, wherein the tie-bar is secured by pins lying in the plane of rotation of the rotor.

7. A rotor as claimed in claim 1, wherein a lead/lag damper is connected between the outer end of the arm and the housing.

8. A rotor as claimed in claim 7, wherein the lead/lag damper lies in the plane of rotation or the rotor and on the opposite side of the housing to the arm.

9. A rotor as claimed in claim 7, wherein the lead/lag damper is an elastomeric damper.

10. A rotor as claimed in claim 1, wherein the axis of rotation is the axis of a main rotor system of a rotary wing aircraft.

* * * * *